United States Patent [19]

Karppo

[11] 4,247,504
[45] Jan. 27, 1981

[54] METHOD OF MANUFACTURING PLASTIC COVERED HIGHVOLTAGE CABLES

[75] Inventor: Jukka S. Karppo, Helsinki, Finland

[73] Assignee: Oy Nokia AB, Helsinki, Finland

[21] Appl. No.: 840,418

[22] Filed: Oct. 7, 1977

[30] Foreign Application Priority Data

Oct. 18, 1976 [FI] Finland .............................. 762964

[51] Int. Cl.³ .............................................. B29F 3/10
[52] U.S. Cl. ............................ 264/174; 174/120 SC; 425/133.1
[58] Field of Search ................... 264/174; 174/113 R, 174/120 R, 120 SC, 120 SR, 23 C; 428/373; 425/113, 114, 133, 106 SC

[56] References Cited

U.S. PATENT DOCUMENTS

| | | | |
|---|---|---|---|
| 2,624,777 | 1/1953 | Abbott et al. ................. | 174/120 SR |
| 3,433,891 | 3/1969 | Zysk et al. ..................... | 174/120 R |
| 3,571,490 | 3/1971 | Bunish et al. ................... | 174/113 R |
| 3,576,388 | 4/1971 | Bruns .............................. | 174/113 R |
| 3,576,940 | 5/1971 | Stone et al. ..................... | 174/113 R |
| 3,666,876 | 5/1972 | Forster ........................... | 174/120 SC |
| 3,681,515 | 8/1972 | Mildner .......................... | 174/113 R |
| 3,773,109 | 11/1973 | Eberline ......................... | 174/113 R |
| 3,792,192 | 2/1974 | Plate .............................. | 174/106 SC |
| 3,816,644 | 6/1974 | Giffel et al. .................... | 174/113 R |
| 3,878,319 | 4/1975 | Wahl .............................. | 174/120 SC |
| 3,885,085 | 5/1975 | Bahder et al. .................. | 174/120 SC |
| 3,889,049 | 6/1975 | Legg et al. ...................... | 174/113 R |
| 3,962,517 | 6/1976 | Verne ............................. | 174/120 SC |
| 3,965,226 | 6/1976 | Werwitzke et al. ............. | 264/174 |
| 3,973,385 | 8/1976 | Roe ................................ | 174/113 R |
| 4,029,830 | 6/1977 | Yamamoto et al. ........... | 174/120 SC |
| 4,078,111 | 3/1978 | Yamaguchi et al. ............ | 264/174 |
| 4,095,039 | 6/1978 | Thompson ..................... | 174/120 SC |
| 4,104,480 | 8/1978 | Thompson ..................... | 174/23 C |
| 4,132,858 | 1/1979 | Anderson et al. .............. | 174/120 SC |

FOREIGN PATENT DOCUMENTS

| | | | |
|---|---|---|---|
| 883083 | 6/1943 | France ........................... | 174/120 R |
| 1540584 | 9/1966 | France ........................... | 174/120 R |
| 529585 | 7/1955 | Italy ............................... | 174/120.4 |
| 1064622 | 4/1967 | United Kingdom ............ | 174/102 SC |
| 1168128 | 10/1969 | United Kingdom ............ | 174/120 SC |
| 1299563 | 12/1972 | United Kingdom ............ | 174/102 SC |
| 1366140 | 9/1974 | United Kingdom ............ | 174/120 SR |
| 1432560 | 4/1976 | United Kingdom ............ | 174/120 SC |

*Primary Examiner*—Jay H. Woo
*Attorney, Agent, or Firm*—Finnegan, Henderson, Farabow, Garrett & Dunner

[57] ABSTRACT

A method of manufacturing a plastic covered highvoltage cable by passing an electrical conductor through two successive separate extrusion heads. In the first extrusion head a conductor shield layer is extruded around said conductor as well as a thin auxiliary insulation layer around the conductor shield layer. In the second extrusion head a main insulation layer is extruded around the auxiliary insulation layer as well as, if preferable, a corona shield layer around the main insulation layer. The auxiliary insulation layer is of the same or electrically equivalent material as the main insulation layer. The auxiliary insulation layer prevents the formation of plastics burr on the surface of the conductor shield layer from during the first extrusion.

8 Claims, 4 Drawing Figures

METHOD OF MANUFACTURING PLASTIC COVERED HIGHVOLTAGE CABLES

This invention relates to a method of manufacturing plastic covered high-voltage cables, wherein a conductor shield layer is extruded by means of a plastics extrusion head around an electrical conductor, and a main insulating layer and, if necessary, a corona shield layer are extruded by means of a separate second plastics extrusion head around the conductor shield layer.

In a high-voltage cable (voltage more than 10 kV) made by means of extrusion the following structure is commonly used: A metal conductor is covered by a conductor shield layer extruded of a semi-conducting material, and the actual cable insulation layer is extruded around the conductor shield. The insulation layer is covered by a corona shield layer extruded of a semi-conductive material, and the corona shield layer is in turn covered by a metal layer such as a lead sheath, a copper strip or similar material.

The semi-conductive material usually contains up to 50 percent coal and the specific resistance thereof varies from some ten to several thousand ohm centimeters. Because the capacitive displacement current passing through the cable insulation layer is very small, the semiconductive material can be considered to be a very good conductor with regard to capacitive currents.

If the insulating layer is free of defects, the voltage strength and the lifetime of the cable nearly entirely depend on the quality of the interfaces between the insulating layer and the inner and outer conducting layers. If these interfaces include points of discontinuity such as grooves, sharp points, etc., the electric field in the insulation layer may due to such points become locally tens of times stronger as compared to the strength of the field in an interface free of defects. These strong electric fields which occur at points of discontinuity result in a break-down of the cable considerably earlier than the normal lifetime would imply.

The purpose of the conductor shield layer therefore is to form against the insulating layer an interface which is as even as possible and which mechanically well adheres to the insulation layer. The conductor is often made of several wire strands and the surface thereof has, even if the conductor would be solid, various points of discontinuity such as small scratches, sharp points, etc. Moreover, the adhesion between the metal conductor and the insulation material extruded thereon is minimal. Due to this minimal adhesion a slit which is also very harmful may easily be formed between the conductor and the insulation when the cable is bent.

High-voltage cables are manufactured in extrusion lines, wherein a cable conductor first passes through an extrusion head in which a conductor shield layer is formed around the conductor. Thereafter the product proceeds to a second extrusion head in which an insulation layer or both an insulation layer and a corona shield layer are extruded around the conductor shield layer.

In general, a phenomenon called burr formation is noted in all extrusion operations. This refers to the accumulation of extruded material on the outer front surfaces of the extrusion matrix. In the present case, semiconductive material accumulates as a ring around the outlet hole in the outer matrix of the extrusion head used for extruding the conductor shield layer. After the accumulation has grown for some time, particles of an indefinite shape come loose from said accumulation and stick to the outer surface of the conductor shield layer. When the product proceeds to the next extrusion head, where insulating material is extruded around the conductor shield layer, the particles produce above mentioned harmful points of discontinuity in the critical interface between the conductor shield layer and the insulation layer. In addition, the conductor shield layer may be damaged when contacting the inner matrix of the second extrusion head.

A method is also known according to which all three layers are extruded at the same time in the same extrusion head. Such a method is described, for example, in British patent specification No. 1,064,622. The disadvantage in this method is that it is impossible to control the thickness of the conductor shield layer and the quality of the interface during the extrusion of the plastics. Such a triple extrusion head is, moreover, very complicated.

It is the object of the present invention to eliminate the harmful effects caused by the mechanical damages of the conductor shield layer and by said burr formation impairing the quality of the interface between the insulation layer and the conductor shield layer in a high-voltage cable manufactured according to the first mentioned method.

This object is accomplished according to the invention by a method which is characterized in that in connection with the extrusion of the conductor shield layer there is, additionally, extruded in the same extrusion head which extrudes the conductor shield layer a thin auxiliary insulating layer of the same material as the main insulating layer or of a material which is electrically equivalent thereto.

The invention has the advantage that the burr accumulating on the matrix of the extrusion head for the conductor shield layer is prevented from getting in contact with the surface of the conductor shield layer and any particles coming loose can only stick to the outer surface of the thin auxiliary insulating layer. Furthermore the burr is of insulating material, wherefore the particles coming loose could not even produce harmful points of discontinuity in the surface of the conductor shield layer. In addition, the thin insulating layer protects the surface of the conductor shield layer from mechanical damages which may be caused by the sleeve guiding the cable into the second plastics extrusion head.

The accompanying drawings serve the purpose of illustrating the invention.

Figure 1:
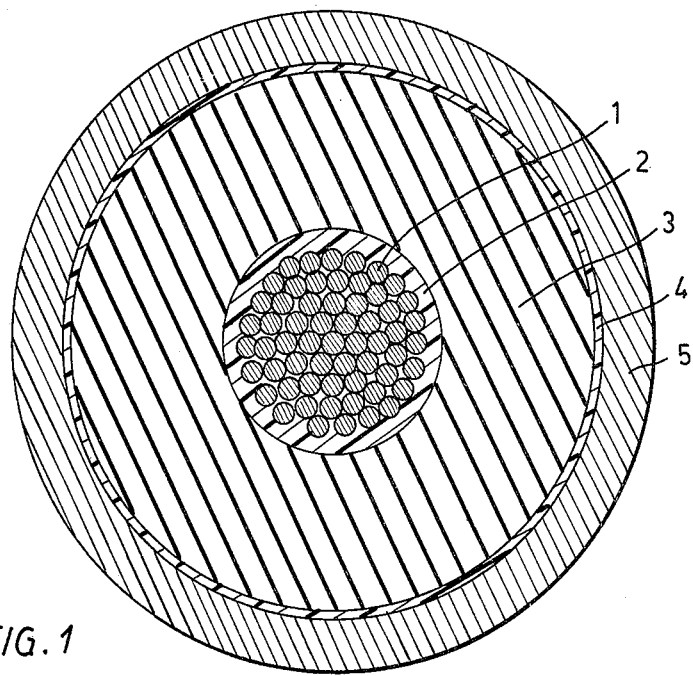
FIG. 1 is a cross-sectional view of a conventional high-voltage cable.

FIG. 1 illustrates an earlier known high-voltage cable, in which a conductor 1 is covered by a conductor shield layer 2 provided with a covering insulation layer 3. The insulation layer is covered by a corona shield layer 4. The outer layer 5 defines the outermost mechanically resistant structure of the cable.

Figure 2:
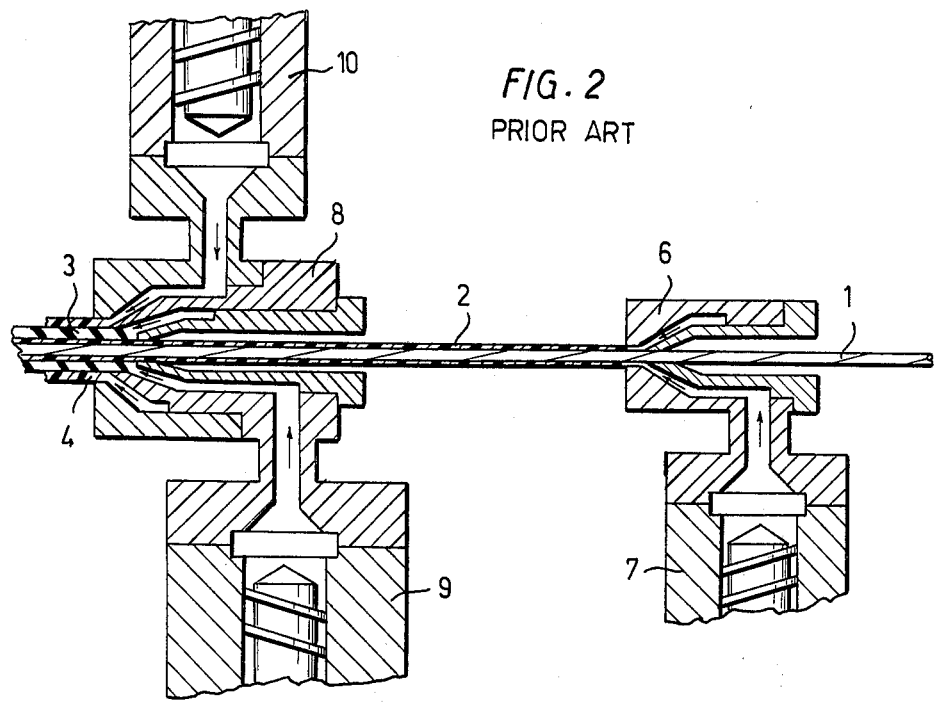
FIG. 2 illustrates the position of the extrusion heads and extruders used for making a conventional cable.

FIG. 2 illustrates the manufacture of the cable according to FIG. 1. The conductor 1 passes through an extrusion head 6 for the conductor shield layer where semiconductive plastics discharged from an extruder 7 froms the conductor shield layer 2 around the conductor 1. In an insulation extrusion head 8, the insulation layer 3 is extruded from an extruder 9 around the conductor shield layer. Semiconductive plastics from an extruder 10 forms the corona shield layer 4 around the insulation layer 3.

Figure 3:
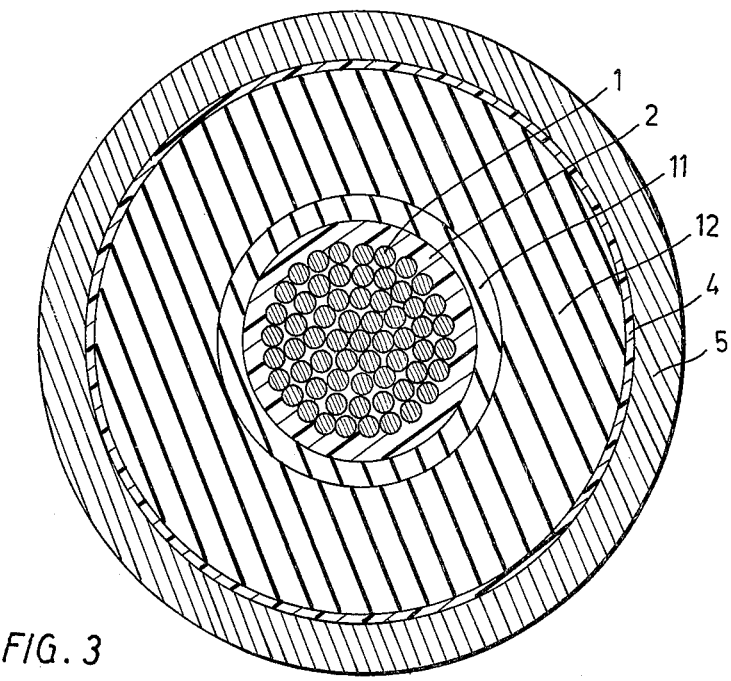
FIG. 3 is a cross-sectional view of a high-voltage cable made in accordance with the method according to the invention.

FIG. 3 illustrates a cable manufactured by the method according to the invention, in which the conductor 1 is surrounded by the conductor shield layer 2 around which a thin auxiliary insulating layer 11 is extruded. This is followed by a main insulation layer 12 which is covered by the corona shield layer 4. The above mentioned layer 5 is positioned outermost.

Figure 4:
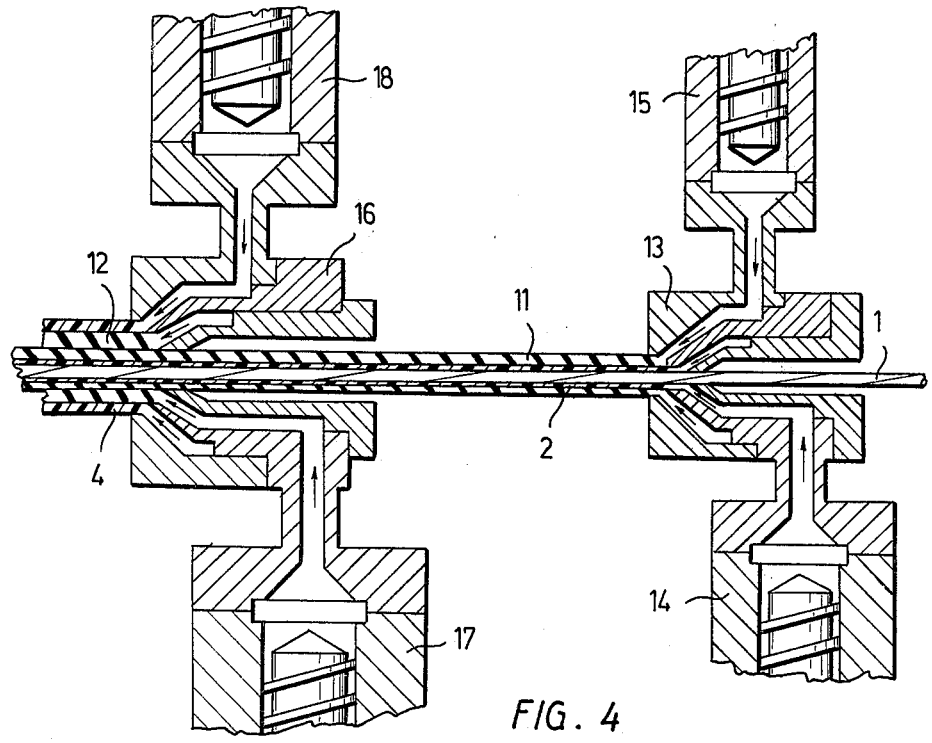
FIG. 4 illustrates a device for carrying out the invention.

FIG. 4 shows a device for applying the method according to the invention. The device includes two separate plastics extrusion heads 13 and 16, of which at least the first extrusion head 13 is a double extrusion head. According to the method, the cable conductor 1 is guided through the extrusion head 13 in which conductor shield layer 2 of a semiconductive material is extruded around the conductor by means of an extruder 14. An auxiliary extruder 15 is connected to the same extrusion head 13. The auxiliary extruder 15 is fed with the same material that is used for the extrusion of the main insulating layer 12 or with a material which is electrically equivalent to this material. A thin insulating layer 11 is extruded by means of the auxiliary extruder 15 in the extrusion head 13 around the conductor shield layer 2. The thickness of the insulating layer 11 is preferably between 0.1 mm and 0.3 mm.

The conductor thus coated is guided to the second extrusion head 16. In this extrusion head, a layer of insulating material 12 is extruded by means of an extruder 17 around the thin insulating layer 11. The thickness of the layer of insulating material extruded in this extrusion head is preferably between 4 mm and 20 mm depending on the voltage strength required of the cable and other similar factors. An additional extruder 18 may be connected to the second extrusion head 16, whereby the corona shield layer 4 of a semiconductive plastics is extruded by means of the extruder around the insulating layer 12. The thickness of such a corona shield layer is preferably between about 0.5 mm and 2 mm.

The drawings and the accompanying specification are only intended to illustrate the idea of the invention. In fact, the embodiments of the invention may vary within the scope of the claims.

What I claim is:

1. A method of manufacturing multilayered high voltage cables comprising the steps of:
   extruding in a single operation in a first extrusion means a concentric semiconductive conductor shield layer around a conductor core and a relatively thin concentric auxiliary insulation layer over said semiconductive conductor shield layer to avoid the formation of points of discontinuity at the interface of said semiconductive conductor shield layer and said auxiliary insulation layer, the thickness of said auxiliary insulation layer being such that the quality of the interface between said shield layer and said auxiliary insulation layer can be readily maintained; and
   extruding in a separate operation in a second extrusion means a concentric main insulation layer, electrically equivalent to said auxiliary insulation layer, over said auxiliary insulation layer, said main insulation layer being relatively thick as to said auxiliary insulation layer.

2. The method of claim 1 wherein the auxiliary insulation and the main insulation layer are formed of the same material.

3. The method of claim 2 further comprising the step of extruding a concentric corona shield layer over said main insulation layer.

4. The method of claim 3 wherein said semiconductive conductor shield layer, said auxiliary insulation layer, said main insulation layer and said corona shield layer are all formed of plastic material.

5. The method of claim 1 wherein the thickness of said auxiliary insulation layer is between 0.1 mm and 0.3 mm.

6. The method of claim 1 wherein the thickness of said main insulation layer is between 4 mm and 20 mm.

7. The method of claim 3 wherein the thickness of said corona shield layer is between 0.5 mm and 2 mm.

8. A method of manufacturing multi-layered, plastic-covered high-voltage cables comprising the steps of:
   successively extruding in a single operation a concentric semiconductive conductor shield layer around a conductor core and an auxiliary insulation layer over said semiconductive conductor shield layer to avoid the formation of points of discontinuity at the surface of said semiconductive shield layer, and
   successively extruding in a separate, single operation a concentric main insulation layer, of the same material as and electrically equivalent to said auxiliary insulation layer, over said auxiliary insulation layer and a corona shield layer over said main insulation layer to avoid the formation of points of discontinuity at the interface of said main insulation layer and said corona shield layer, said main insulation layer being relatively thick as to said auxiliary insulation layer.

* * * * *